United States Patent [19]

Ferrari et al.

[11] Patent Number: 5,468,109
[45] Date of Patent: Nov. 21, 1995

[54] QUICK REMOVABLE FASTENERS IN PARTICULAR FOR FURNITURE

[75] Inventors: Franco Ferrari, Frazione Deviscio, 2, 22053 Lecco; Carlo Migli, Lecco, both of Italy

[73] Assignee: Franco Ferrari, Italy

[21] Appl. No.: 189,882

[22] Filed: Feb. 1, 1994

[30] Foreign Application Priority Data

Feb. 11, 1993 [IT] Italy .................... MI93U0113
Nov. 12, 1993 [IT] Italy .................... MI93U0878

[51] Int. Cl.⁶ .................................... F16B 37/14
[52] U.S. Cl. ................. 411/553; 411/180; 411/549
[58] Field of Search ...................... 411/513, 552, 411/553, 549, 180, 178, 436, 527, 526, 525

[56] References Cited

U.S. PATENT DOCUMENTS

| 2,252,286 | 8/1941 | Hathorn | 411/352 X |
| 2,337,483 | 12/1943 | Marty | 411/549 |
| 2,552,066 | 5/1951 | Sorensen | 411/549 X |
| 2,936,501 | 5/1960 | Koch | 411/549 |
| 4,275,263 | 6/1981 | Chino | 411/178 X |
| 5,356,255 | 10/1994 | Takahashi et al. | 411/180 X |

FOREIGN PATENT DOCUMENTS

| 121063 | 2/1946 | Australia | 411/553 |
| 595565 | 2/1978 | Switzerland | 411/552 |
| 588886 | 6/1947 | United Kingdom | 411/549 |
| 2195390 | 4/1988 | United Kingdom | 411/549 |

*Primary Examiner*—Peter M. Cuomo
*Assistant Examiner*—Jerry Redman
*Attorney, Agent, or Firm*—Shlesinger, Fitzsimmons & Shlesinger

[57] ABSTRACT

A removable fastener (10, 110) for a part (25, 28, 122) such as a furniture accessory with a hole in a surface (24, 120) comprises a dowel anchor (11, 11', 111) with ribbing thereon (23, 112) for lateral engagement in the surface hole. The dowel anchor comprises a seat (13, 113) in which is received the end of an element (12, 12', 114) in turn constrained to the part and there being between the element and the seat a form of separable mutual constraint. The element is provided in the form of a dowel or pin (12, 12', 114) constrained to the part to be axially insertable in the seat (13, 113) in the dowel anchor and the constraint comprises elastically yielding elements (14, 15, 40, 41, 117) projecting toward the axis of the seat (13, 113) to engage the side wall of the dowel (12, 12', 114) upon its insertion in the seat.

24 Claims, 3 Drawing Sheets

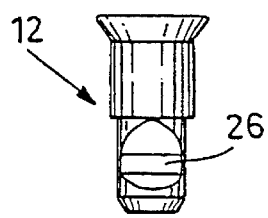
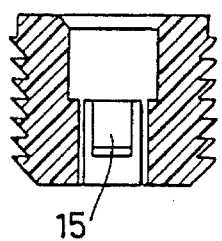
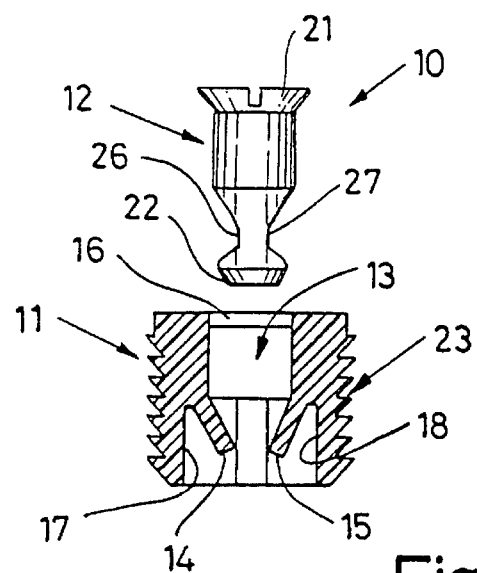
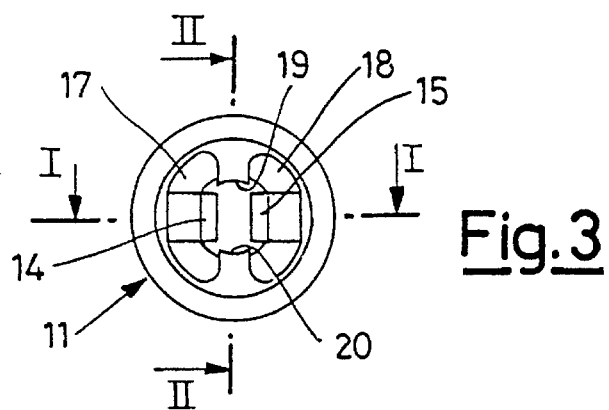
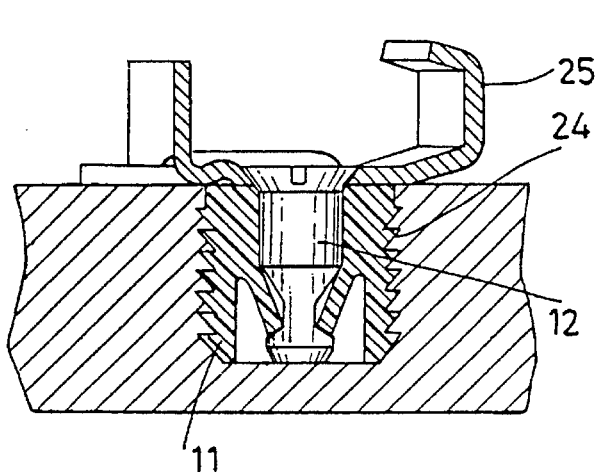
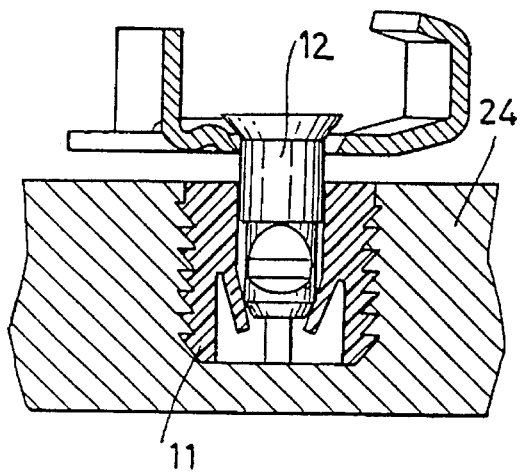

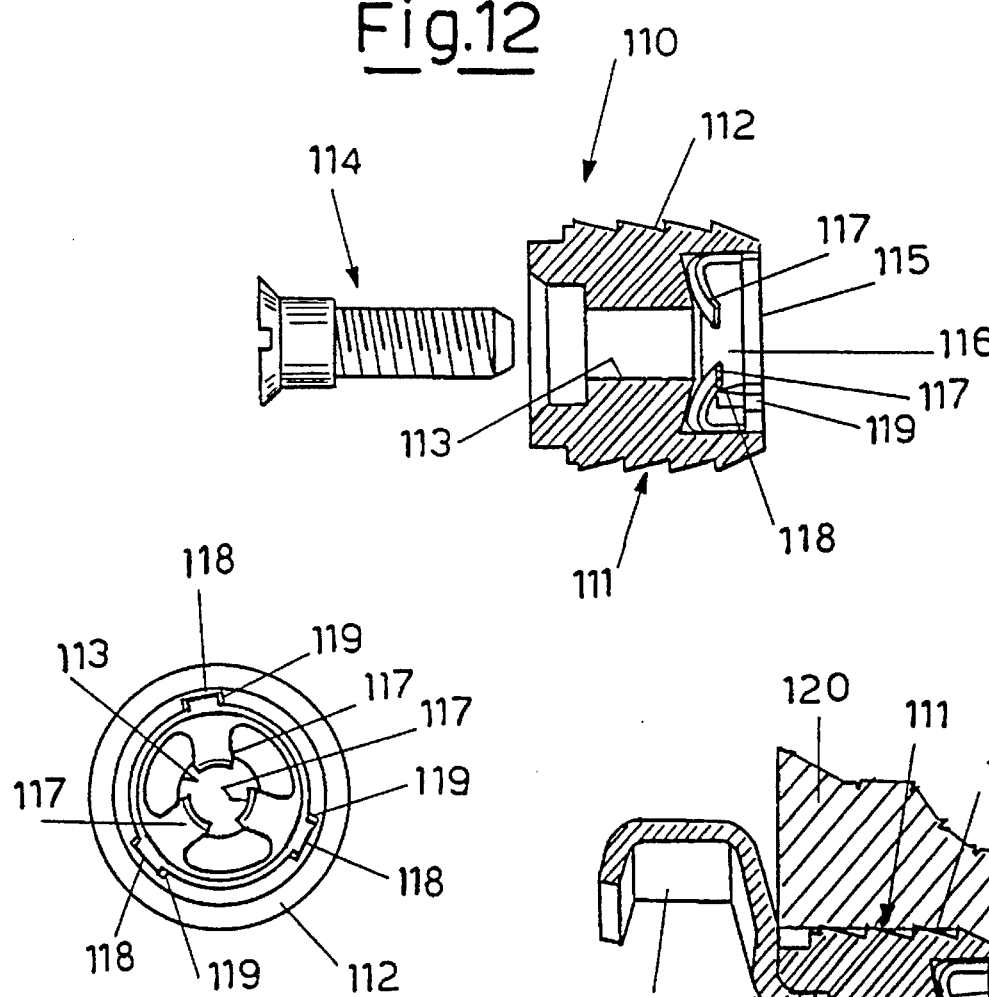

5,468,109

QUICK REMOVABLE FASTENERS IN PARTICULAR FOR FURNITURE

BACKGROUND OF THE INVENTION

The present invention relates to fasteners for snap fastening and in particular for fastening furniture hardware elements such as hinges, drawer slides, etc, There are known fasteners comprising dowel anchors to be engaged in holes in furniture panels while in said dowel anchors there being subsequently engageable fastening screws for hinges, slides, etc.

In the furniture industry there is an ever growing requirement to reduce assembly time for the various components of the furnishings whether during assembly at the works or during final installation at the user's site. From this viewpoint screw assembly is quite unsatisfactory. There have also been proposed faster systems, e.g. with pressure assembly, but which are not easy to disassemble, and dovetail systems requiring dedicated tools for assembly and disassembly or requiring special handling to achieve engagement, which requires a certain skill from the assembler and does not permit great speed of assembly. In addition, dovetail systems are often relatively costly because of the structural complications they involve.

SUMMARY OF THE INVENTION

The general purpose of the present invention is to supply economical fasteners permitting fast assembly and allowing at the same time easy disassembly without the need of special tools or skills on the part of the installer. In view of said purpose it is sought to provide in accordance with the present invention a removable fastener for a part such as a furniture accessory with a surface hole comprising a dowel anchor with means of lateral engagement in the surface hole and the dowel anchor comprising a seat in which is received the end of a dowel in turn constrained to the part and between the element and the seat there being present separable mutual constraint means and characterized in that the element is provided in the form of a dowel constrained to the part to be axially insertable in the seat in the dowel anchor and the constraint means comprising elastic yielding elements projecting in the seat to engage on opposite sides of the dowel.

BRIEF DESCRIPTION OF THE DRAWINGS

To clarify the explanation of the innovative principles of the present invention and its advantages compared with the known art there is described below with the aid of the annexed drawings possible embodiments thereof by way of nonlimiting examples applying said principles. In the drawings:

FIG. 1 shows a side view sectioned through plane of cut I—I of FIG. 3 showing a first fastener in accordance with the present invention, FIG. 2 shows a view similar to that of FIG. 1 but sectioned through plane of cut II—II of FIG. 3, FIG. 3 shows a bottom plan view of a fastener in accordance with the present invention, FIGS. 4 and 5 show a side cross section of the fastener of the above Figs. in a possible application, FIG. 12 shows a partial exploded longitudinal cross section of an other device or dowel anchor joint in accordance with the present invention, FIG. 13 shows a rear view of the joint of FIG. 12, and FIG. 14 shows a view similar to that of FIG. 12 but with the element in use.

DETAILED DESCRIPTION OF THE INVENTION

Figure 6:
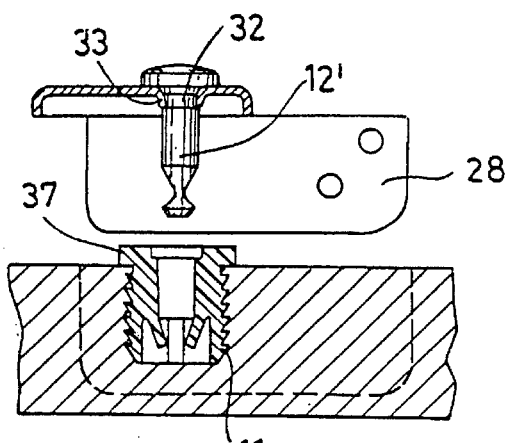
FIG. 6 shows a fastener similar to that shown in FIG. 1 in another possible application.

With reference to the Figs., FIG. 1 shows a first fastener or joint in accordance with the present invention indicated generally by reference number 10. The joint 10 comprises a dowel anchor 11 made from relatively yielding material and in which engages a connecting dowel 12. As may be seen also in FIG. 2, the dowel 12 has a generally cylindrical form with one end bearing an enlarged handling head 21, e.g. provided with a screwdriver notch. Near the other end, the peripheral surface of the dowel has two diametrally opposed notches 26, 27 arranged in a mutually symmetrically manner. The insertion end of the dowel can advantageously have a taper 22 to facilitate insertion. As may be seen in FIGS. 1, 2 and 3 the dowel anchor 11 has an axial hole 13 for reception with minimal side play of the dowel 12. Optionally the mouth 16 of the hole can have a flaring to facilitate insertion of the dowel. In the hole 13 projects a pair of facing tabs 14, 15 with free ends inclined toward each other and in the direction opposite the opening 16 for insertion of the dowel 12 in the hole 13.

Level with the tabs there are two widened cavities or undercuts 17, 18 extending at least behind the tabs to permit reciprocal elastic withdrawal movement of the tabs. Advantageously for reasons clarified below the end part of the dowel bearing the notches or cavities 17, 18 has a smaller diameter than the seat or hole 13. As may be seen in FIG. 3 between the undercuts 17, 18 there are made two steps 19, 20 with facing surfaces which receive with minimal side play the part of the cylindrical dowel with smaller diameter so that the dowel is supported for its entire length.

The dowel anchor 11 has advantageously a cylindrical form coaxial with the hole 13 and an external side surface with ribbing 23 constituting as clarified below means of engagement of the dowel anchor in a suitable hole in the assembly surface. For example, the ribbings 23 can be circumferential ribbings shaped like an arrow in the direction of insertion of the dowel in the anchor. As an alternative there can be conceived ribbings arranged helically to form an engagement threading or the like. In FIGS. 4 and 5 is shown a possible employment of the above described joint to fasten to a surface 24 a hardware element 25. The surface 24 can be e.g. a wood panel providing a shoulder or a drawer compartment of a furniture item and the hardware element can consequently be a guide for the drawers.

The dowel anchor 11 is inserted, e.g. by pressure, in a complementary hole made in the surface 24. The retention means 23 prevent removal of the dowel anchor. In the dowel anchor can then be inserted by force the dowel 12 after it has been passed through a fastening hole of the element 25. As may be seen in FIG. 4, by maintaining the notches 26, 27 aligned with the tabs, upon complete insertion of the dowel the yielding tabs 14, 15 snap out and project into the notches 26, 27. The free ends of the tabs engage against the striker surface formed by the wall of the notches and the arrow arrangement of the tabs blocks the dowel to prevent is removal. The presence of the dowel 12 in the hole 13 also makes the engagement between the dowel anchor and the panel 24 stronger while supplying a slight expansion of the dowel anchor which is compressed during insertion in the complementary hole in the panel. To disassemble the joint it suffices to rotate the dowel 12 90° so as to bring its cylindrical surface in alignment with the tabs. As may be seen in FIG. 5, the tabs are thus pushed radially outward and disengage from the notches to permit easy withdrawal of the dowel from its seat in the anchor. Thanks to the smaller diameter of the dowel, in its end zone near the tabs the latter are not bent excessively outward, thus reducing stress on the material.

Naturally the dowel head will be formed in accordance with the requirements of the piece to be fastened. For example, if it is required that the head remain flush with the surface of the fastened piece a dowel with a tapered head can be provided as shown in FIGS. 1 to 5. FIG. 6 shows a dowel 12' with projecting head, e.g. to fasten a known cup element 28 of a furniture hinge.

Figure 7:
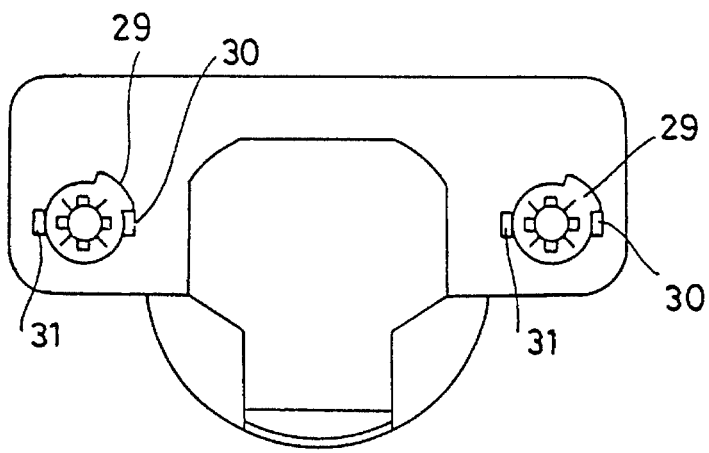
FIG. 7 shows a top plan view of the element of FIG. 6.

As may be seen in FIG. 7 the dowel head has a radial projection 29 which interferes with two teeth 30, 31 projecting from the surface of the cup at the sides of the hole where the dowel passes. The size of the projection and the position of the teeth are such as to permit axial rotation of the dowel between an engagement position for the notches with the tabs and a disengagement position rotated 90°. As may be seen in FIG. 6 the dowel 12' can advantageously have a circumferential groove 32 near the head so as to receive a bent edge 33 of the hole passing through the element 28 to be fastened. In this manner the dowel is free to rotate but remains axially constrained to the element to be fastened thus speeding up assembly. It is clear that the head of the dowel can also have different means of gripping for handling thereof and not necessarily a notch for a blade or cross screwdriver. For example, there can be provided an engagement for a hexagonal wrench or projections for manual handling without tools.

As shown in FIG. 6 the dowel anchor can have an edge 37 projecting circumferentially to the insertion end of the dowel to prevent excessive penetration of the dowel anchor in the engagement surface.

Figure 8:
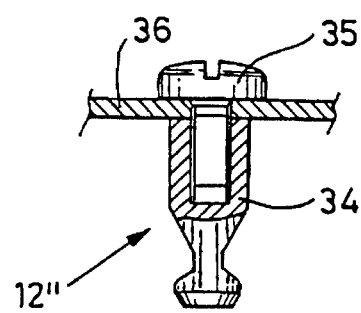
FIG. 8 shows a possible variation of a fixing element of the fastener in accordance with the present invention.

There can of course be imagined other means of constraining the engagement dowels with the piece to be fastened. For example, FIG. 8 shows an engagement pin 12" provided in two parts. A first part 34 has a form similar to that of the legs of the dowels described above while a second part 35 consists of a screw which screws into a threaded hole axial with the stem 34. It is thus easy to place between the screw and the stem an element 36 to be fastened. The thread of the screw can be provided of a length such as to permit mutual locking between the screw and the stem without preventing their rotation in the passing hole in the element. 36.

Figure 9:
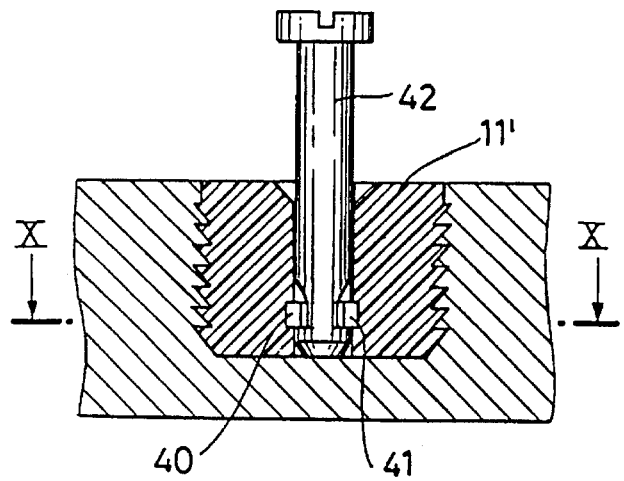
FIG. 9 shows a cross sectioned side view of a possible different embodiment of a fastener in accordance with the present invention.
Figure 10:
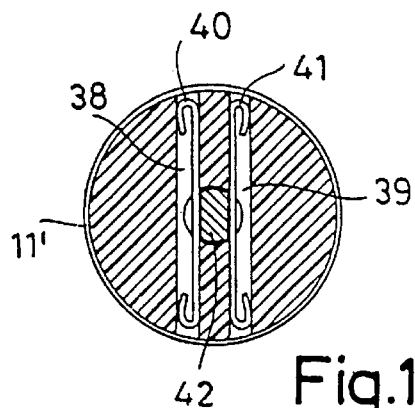
FIGS. 10 and 11 show a cross section view along plane of cut X—X of the fastener of FIG. 9 in two different engagement conditions.
Figure 11:
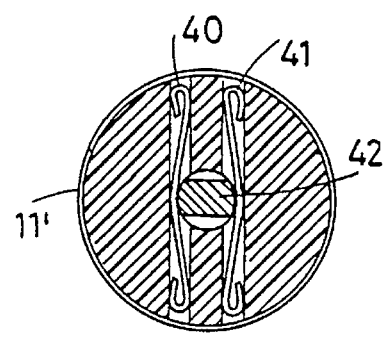

Naturally the above description of an embodiment applying the innovative principles of the present invention is given merely by way of example and therefore is not to be taken as a limitation of the patent right claimed here. For example, the radial elastic engagement means of the dowel anchor can be provided in a different manner from elastic tabs 14, 15 in a single piece with the dowel anchor. For example, FIGS. 9, 10 and 11 show a possible variation in which the dowel anchor 11' has two notches 38, 39 parallel to each other and arranged to intersect the passing hole of the dowel on both sides of its symmetry axis. Two flexible laminations 40, 41 are provided with free ends bent back and are inserted in the two passages 38, 39 so as to pass with their central part in the dowel hole clear space.

Upon insertion of the dowel 42 the two laminations engage elastically in the notches of the latter and prevent its withdrawal. Bending back of the ends of the laminations has the result that on their exterior side remains a free opening which allows elastic bending thereof in opposite directions as shown in FIG. 11 upon rotation of the dowel so as to permits its withdrawal merely by 90° rotation. With this embodiment the dowel anchor need not be of elastic material. Clearly the lamination means 40, 41 need not consist of a flat lamination but can be in the form of a piano wire with round section.

As another embodiment variation in FIG. 9 the dowel 42 is shown with the stem longer than the seat in the dowel anchor to permit e.g. fastening of elements which are thick or furnish a side surface like a cam for known closing mechanisms.

FIG. 12 shows a further dowel anchor joint element made in accordance with the present invention and indicated generically by reference number 110, and which comprises a dowel anchor body 111 provided in relatively yielding material, e.g. plastic. The dowel anchor 111 has a substantially cylindrical shape with circumferential ribbings 112 of generally triangular cross section and tapered in the direction of insertion of the dowel anchor in a hole or reception seat. The dowel anchor 111 has an axial hole for reception of a dowel 114 with widened head. The bottom of the hole 113 terminates in a widened seat 115 in which is inserted an elastic washer 116. As may be seen also in FIG. 13 the washer 116 is shaped with a plurality of teeth or tabs 117 directed radially toward the axis of the hole 113 and appropriately inclined in the direction of insertion of the dowel 114 in the hole 113. The teeth delimit with their ends a passage with dimensions slightly less than the diameter of the dowel.

As shown in FIG. 14, when in use the dowel anchor 111 is inserted by pressure inside a hole made in the fastening surface 120, e.g. a wall or a door of a furniture item. The stem of the dowel 114 is passed through a hole provided for that purpose in the hardware element or part 122 which it is wished to constrain to the surface 120 and then engaged by force in the hole 113. When inserting the dowel in the hole 113 the slight forcing of the dowel on the edges of the washer teeth 117 cause the teeth to bend slightly without exerting excessive resistance to complete introduction of the dowel. Axial withdrawal of the dowel is prevented by the digging effect resulting from the angle formed by the teeth with the axis of the dowel.

It is clear that such a dowel anchor fastener does not require particularly close axial positioning tolerances. Furthermore its assembly is very fast and requires no assembly tools, If it is desired to provided a disassemblable system in order to permit withdrawal of the dowel it is possible, for example as illustrated by the threads shown on the shanks of the dowels 114 in FIGS. 12 and 14, to provide the dowel with a light helical cut or threading along its cylindrical wall. In this manner the dowel locks in the dowel anchor as described above but can be easily removed by rotating it with a screwdriver. For this purpose the dowel head is cut. Optionally extraction can be aided by a slight axial traction during rotation.

As an alternative to or conjointly with the helical cut the teeth 117 can be provided inclined so that their ends form a screw in such a manner that the rotary movement of the dowel pushes it in an axial direction. In addition to disassembly the capability of axial movement of the dowel as a result of its rotation also permits increase of traction of the joint by rotating the dowel in a direction opposite that of disassembly to increase its penetration in the dowel anchor, As may be seen in FIGS. 12 and 14, to prevent the teeth of the washer from overturning under the axial traction effect exerted by the dowel the bottom of the cavity 115 can be advantageously provided an tapered form. This prevents the teeth from straightening beyond the taper angle of the bottom on which the washer rests.

In addition the washer, e.g. pressed from sheet metal, can advantageously comprise peripheral projections or tabs 118 which engage in corresponding seats 119 in the dowel anchor to prevent rotation thereof with the rotating dowel.

To give good support to the threaded dowel teeth it was found advantageous to provide the threading with a number of threads equal to the number of teeth.

At this point it is clear that the purposes of the present invention have been achieved by supplying quick joints of great economy and safe holding.

Naturally the above description of an embodiment applying the innovative principles of the present invention is given merely by way of example and therefore is not to be taken as a limitation of the patent right claimed here. For example, the proportions of the various parts can vary depending on the specific requirements of use. In addition, if disassembly capability is not required in embodiment show in FIG. 12, helical machining of the teeth can be avoided. The washer can also be incorporated in the dowel anchor during a pressing phase of said dowel anchor.

What is claimed is:

1. A removable fastener for securing a first part, such as a furniture accessory, to a second part which has a hole in a surface thereof, comprising a dowel anchor disposed to be press fit into said hole and having thereon means of lateral engagement with said second part in said hole, and said dowel anchor having therein an opening in which is seated one end of an element which in turn is constrained adjacent its opposite end to the first part, and between said one end of the element and said opening there being separable mutual constraint means, and characterized in that said element is a dowel constrained at one end to the first part and disposed to be axially insertable at its opposite end into the opening in the dowel anchor, and said constraint means comprising elastic yielding elements on said dowel anchor projecting into engagement with opposite sides of the dowel adjacent said one end thereof.

2. Fastener in accordance with claim 1 characterized in that said elastic yielding elements comprise two elements projecting inwardly from opposite directions into said opening to engage in a pair of registering radial notches arranged in opposite sides of said dowel, said dowel being rotatable selectively to rotate said notches out of registry with said notches so as to disengage the yielding elements from the notches and to permit withdrawal of the dowel from the opening.

3. Fastener in accordance with claim 2 characterized in that the yielding elements comprise two elastic laminated means arranged in parallel passages formed in the dowel anchor at opposite sides of said opening to arrange themselves transverse to the direction of insertion of the dowel into the opening and with central portions thereof projecting into the opening to engage in said notches in the dowel.

4. Fastener in accordance with claim 3 characterized in that the laminated means are supported in said passages have free spaces behind them in a direction radial to the seat.

5. Fastener in accordance with claim 4 characterized in that the laminated means have their ends bent to support the laminated means in said free spaces.

6. Fastener in accordance with claim 2 characterized in that the dowel has on said one end thereof a widened head bearing handling means for effecting rotation of the dowel the widened head having thereon radial projections to interfere with corresponding projections formed on said second part to limit rotation of the dowel to an angle of 90° between the engagement and disengagement positions of the yielding elements in the notches.

7. Fastener in accordance with claim 2 characterized in that said opposite end of the dowel bearing the notches has a diameter smaller than the diameter of the opening.

8. Fastener in accordance with claim 7 characterized in that facing steps are formed on said anchor and project into said opening for lateral guidance opposite end of said dowel.

9. Fastener in accordance with claim 1 characterized in that the yielding elements comprise elastic tabs on said anchor having free ends thereof projecting radially inwardly toward the axis of said opening and inclined in a direction opposite the dowel insertion direction into the opening thereby to engage the lateral wall of the dowel upon its insertion into the opening.

10. Fastener in accordance with claim 9 characterized in that the tabs are integral with with the dowel anchor.

11. Fastener in accordance with claim 9 characterized in that the tabs are arranged in the opening in the dowel anchor to have spaces behind the tabs at least in a direction radial to the opening.

12. Fastener in accordance with claim 9 characterized in that the elastically yielding tabs are formed on a single washer mounted in the dowel anchor so axially of said opening.

13. Fastener in accordance with claim 12 characterized in that the washer is positioned near the end of the dowel anchor opposite the end into which the dowel is inserted.

14. Fastener in accordance with claim 12 characterized in that the washer is seated in the dowel anchor in a recess having its bottom tapered to constitute a support surface to prevent overturning of the tabs.

15. Fastener in accordance with claim 12 characterized in that the washer has elements for lateral engagement in the dowel anchor thereby to avoid reciprocal axial rotation of the dowel anchor and washer.

16. Fastener in accordance with claim 9 characterized in that the dowel has on said opposite end thereof at least one external cut with helical progression to allow withdrawal of the dowel from the opening by axial rotation.

17. Fastener in accordance with claim 9 characterized in that the tabs have ends for engagement with the dowel inclined helically in relation to the dowel axis to allow withdrawal of the dowel from the opening by axial rotation.

18. Fastener in accordance with claim 1 characterized in that the lateral engagement means of the dowel anchor comprise ribbings projecting radially therefrom.

19. Fastener in accordance with claim 18 characterized in that the ribbings are circumferential ribbings tapered in the direction of insertion of the dowel anchor in the hole in said second part.

20. Fastener in accordance with claim 1 characterized in that the dowel anchor is made from elastically yielding material.

21. Fastener in accordance with claim 1 characterized in that the dowel has on said one end thereof a widened head bearing handling means for effecting rotation of the dowel.

22. Fastener in accordance with claim 1 characterized in that the dowel has thereon adjacent said one end thereof dowel constraint means securing said dowel to said first part to prevent axial sliding of the dowel in said first part and to permit axial rotation of the dowel.

23. Fastener in accordance with claim 22 characterized in that said dowel constraint means comprises a circumferential groove formed in the dowel to receive therein a portion of said first part.

24. Fastener in accordance with claim 22 characterized in that the dowel constraint means comprise a headed screw screwed axially into said one end of the dowel to overlie said one part.

* * * * *